(12) United States Patent
Ando et al.

(10) Patent No.: US 8,727,594 B2
(45) Date of Patent: May 20, 2014

(54) DISPLAY DEVICE

(75) Inventors: Shuta Ando, Mobara (JP); Takashi Kuwabara, Isumi (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/562,346

(22) Filed: Jul. 31, 2012

(65) Prior Publication Data

US 2013/0033893 A1 Feb. 7, 2013

(30) Foreign Application Priority Data

Aug. 3, 2011 (JP) .................................. 2011-169790

(51) Int. Cl.
*F21V 7/04* (2006.01)

(52) U.S. Cl.
USPC .......................................... 362/608; 362/621

(58) Field of Classification Search
USPC .................. 362/608–609, 612–613, 617–626
See application file for complete search history.

(56) References Cited

U.S. PATENT DOCUMENTS

| 8,033,709 B2 * | 10/2011 | Kao et al. ....................... 362/621 |
| 2004/0120139 A1 | 6/2004 | Kunimochi et al. |
| 2008/0278659 A1 * | 11/2008 | Park ................................ 349/65 |
| 2009/0015753 A1 | 1/2009 | Ye |
| 2009/0284688 A1 | 11/2009 | Shiraishi et al. |
| 2010/0284202 A1 | 11/2010 | Pan et al. |

FOREIGN PATENT DOCUMENTS

| JP | 2004-200072 | 7/2004 |
| JP | 2009-276531 | 11/2009 |

\* cited by examiner

*Primary Examiner* — Thomas Sember
(74) *Attorney, Agent, or Firm* — Antonelli, Terry, Stout & Kraus, LLP.

(57) ABSTRACT

The end surface of the light guide plate has a flat surface and a protruding surface which protrudes with respect to the flat surface. Light traveling from the light source in a direction perpendicular to the flat surface enters the light guide plate in an expanded manner due to refraction at the protruding surface. The protruding surface has a shape in which cylindrical surfaces are integrated, the respective cylindrical surfaces being formed about central axes which are orthogonal to the front surface from which the light exits. A pair of cylindrical surfaces, which is positioned at both end portions of the protruding surface in an arraying direction of the cylindrical surfaces, is each adjacent to the flat surface. Adjacent cylindrical surfaces are connected to each other at a position shifted in a protruding direction of the protruding surface with respect to the flat surface.

7 Claims, 9 Drawing Sheets

402

404

DISPLAY DEVICE

CROSS-REFERENCE TO RELATED APPLICATION

The present application claims priority from Japanese application JP 2011-169790 filed on Aug. 3, 2011, the content of which is hereby incorporated by reference into this application.

BACKGROUND OF THE INVENTION

1. Field of the Invention

The present invention relates to a display device.

2. Description of the Related Art

In a display device including a side-light type backlight unit, light entering an end surface of a light guide plate travels inside the light guide plate, and is reflected at an interface on a rear side of the light guide plate to exit from a front surface thereof (Japanese Patent Application Laid-open No. 2009-276531). In recent years, there has been a demand for reducing a region (frame) surrounding a display region of a display panel. In accordance therewith, the backlight unit is also demanded to have a narrower frame, and hence it is necessary to reduce brightness unevenness in the vicinity of a light-entering surface of the light guide plate. Therefore, an attempt has been made to cause refraction and expansion of light by forming irregularities or grooves at the end surface of the light guide plate (Japanese Patent Application Laid-open No. 2004-200072 and US 2004/0120139).

Depending on the shape of the irregularities or the grooves formed at the end surface of the light guide plate, the light traveling angle can be set to range from 0° (direction at right angle to the end surface) to an angle close to 90° (direction parallel to the end surface). When the light traveling angle is small, the light diffusion is insufficient, and hence a dark portion is formed between the end portion of the light guide plate and a light emitting diode (LED). In contrast, when the light traveling angle is large, the dark portion is eliminated, but a bright portion is generated depending on the angle. As described above, when the frame of the backlight unit is formed narrow, there has been a problem in that the brightness unevenness is generated.

SUMMARY OF THE INVENTION

It is an object of the present invention to provide a display device capable of reducing brightness unevenness of a backlight unit and increasing an area of a region which is usable as a planar light source.

(1) According to an exemplary embodiment of the present invention, there is provided a display device, including: a display panel; and a backlight unit to be used as a planar light source for the display panel. The backlight unit includes: alight source having an emission region narrower than an emission region of the planar light source; and a light guide plate having an end surface into which light from the light source enters, and a front surface from which the light exits. The end surface of the light guide plate includes: a flat surface; and one of a protruding surface which protrudes with respect to the flat surface and a recessed surface which is recessed with respect to the flat surface. Light traveling from the light source in a direction perpendicular to the flat surface enters the light guide plate in an expanded manner due to refraction at the one of the protruding surface and the recessed surface. The one of the protruding surface and the recessed surface has a shape in which a plurality of curved surfaces are integrated, the respective plurality of curved surfaces being formed about a plurality of central axes which are orthogonal to the front surface from which the light exits. A pair of curved surfaces of the plurality of curved surfaces, which are positioned at both end portions of the one of the protruding surface and the recessed surface in an arraying direction of the plurality of curved surfaces, is each adjacent to the flat surface. Adjacent curved surfaces of the plurality of curved surfaces are connected to each other at a position shifted in one of a protruding direction and a recessed direction of the one of the protruding surface and the recessed surface with respect to the flat surface. In a cross section taken along a plane parallel to the front surface from which the light exits, the plurality of curved surfaces represent a plurality of arcs, and the flat surface represents a straight line. According to the exemplary embodiment of the present invention, the light which travels in the direction perpendicular to the flat surface and enters the light guide plate travels straight at the flat surface. Further, the light is refracted to a greater extent at a region of the curved surface adjacent to the flat surface, and is refracted to a lesser extent at an adjacent region adjacent to the curved surface. With this, the balance of light distribution can be adjusted, and thus it is possible to reduce the brightness unevenness of the backlight unit and increase the area of the region which is usable as the planar light source.

(2) In the display device according to Item (1), the plurality of arcs may be designed so as to each have a mutually similar shape.

(3) In the display device according to Item (1), the plurality of arcs may each have a similarity ratio that is within ±15% of a reference value.

(4) In the display device according to any one of Items (1) to (3), the plurality of arcs may have one of most protruding points and most recessed points, respectively, which are arranged in a line parallel to the straight line represented by the flat surface.

(5) In the display device according to any one of Items (1) to (4), one of the plurality of arcs, which is positioned at each end in the arraying direction, may be connected to the straight line represented by the flat surface. Further, the straight line and a first tangent line, which is brought into contact with the one of the plurality of arcs at a connection point with respect to the straight line, may form an angle of 70° on a side of the one of the plurality of arcs with which the first tangent line is brought into contact. Further, the straight line and a second tangent line, which is brought into contact with one of adjacent arcs of the plurality of arcs at a connection point between the adjacent arcs, may form an angle of 40° on a side of the one of the adjacent arcs with which the second tangent line is brought into contact.

DETAILED DESCRIPTION OF THE INVENTION

Figure 1:
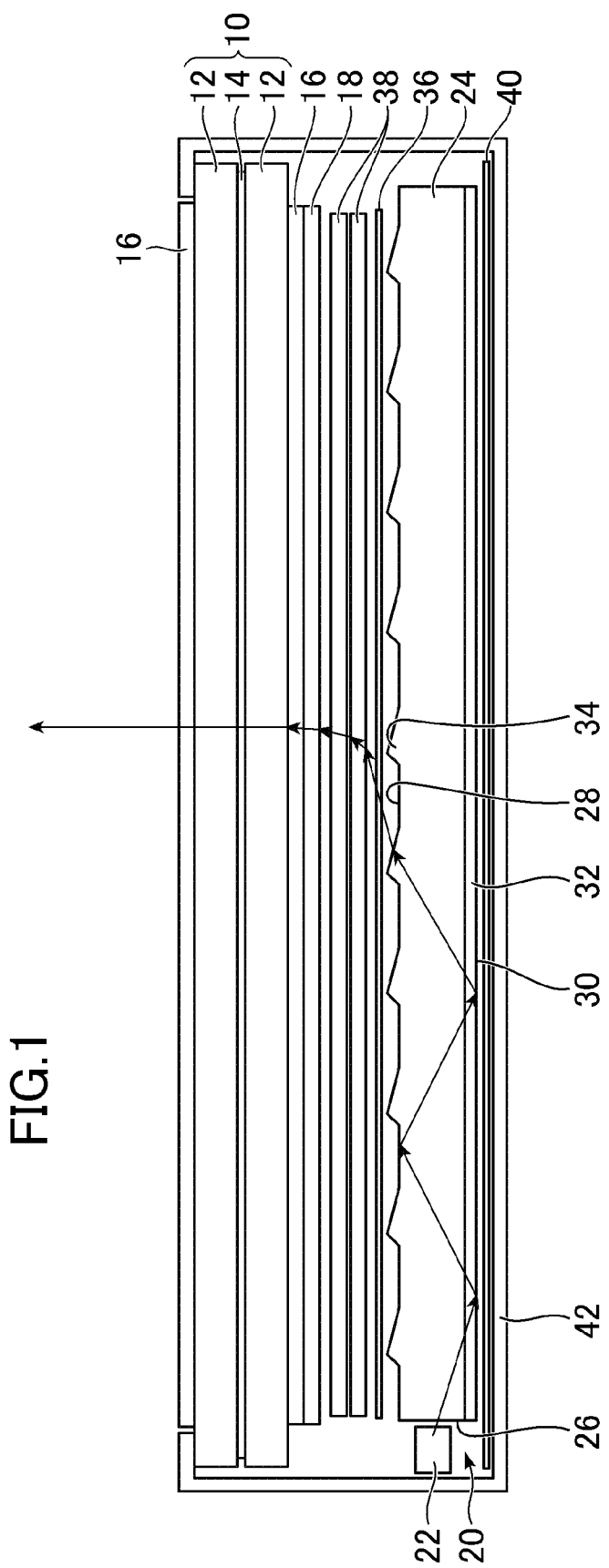
FIG. 1 is a sectional view of a display device according to an embodiment of the present invention.

Hereinafter, an embodiment of the present invention is described with reference to the drawings. FIG. 1 is a sectional view illustrating a display device according to the embodiment of the present invention.

The display device includes a display panel 10. The display panel 10 is a light-shutter type display panel which controls passing and blocking of light to display an image. The display panel 10 illustrated in FIG. 1 is a liquid crystal display panel, and includes a pair of substrates 12 made of glass and the like, a liquid crystal layer 14 sandwiched between the substrates, and polarizing plates 16 arranged on outer sides of the pair of substrates 12, respectively. On the lower polarizing plate 16 (polarizing plate on a side of a backlight unit 20 described later), a film 18 for conversion of polarized light is adhered, to thereby increase a light component containing polarized light oscillating in a light transmission axis direction of the polarizing plate 16.

The display device includes the backlight unit 20 which is used as a planar light source of the display panel 10. The backlight unit 20 includes a light source 22. The light source 22 is a point light source such as a light emitting diode (LED). The point light source has a narrower emission region than that of the planar light source.

The backlight unit 20 includes a light guide plate 24. The light from the light source 22 enters an end surface 26 of the light guide plate 24. Light exits in a planar shape from a front surface 28 of the light guide plate 24. The light guide plate 24 is provided for converting the light of the light source 22 (point light source) into a planar light source to illuminate the display panel 10 with the planar light source.

On a rear surface 30 of the light guide plate 24, a plurality of first convex portions 32 (vertically protruding portions) are formed. The first convex portions 32 each have a ridge line that continues along the light traveling direction. With the formation of the first convex portions 32, expansion of light returning inside the light guide plate 24 by being reflected at the rear surface 30 as an interface is suppressed.

On a front surface 28 of the light guide plate 24, a plurality of second convex portions 34 (laterally protruding portions) are formed. The second convex portions 34 each have a ridge line that crosses the light traveling direction. With the formation of the second convex portions 34, light reflected at the rear surface 30 exits from the front surface 28 without returning inside the light guide plate 24.

Above the light guide plate 24 (on a side closer to the display panel 10), a light diffusion sheet 36 is arranged. The light diffusion sheet 36 has a weak light diffusion action, and hence influence from the light guide plate on light distribution can be weakened when light passes through the light diffusion sheet 36. Above the light diffusion sheet 36 (on a side closer to the display panel 10), two prism sheets 38 are arranged. When light passes through the prism sheets 38, light is collected to the front side to increase the front brightness. Further, below the light guide plate 24 (on a side opposite to the display panel 10), a reflective sheet 40 is arranged. The display device includes a frame 42, and the backlight unit 20 is arranged inside the frame 42.

Figure 2:
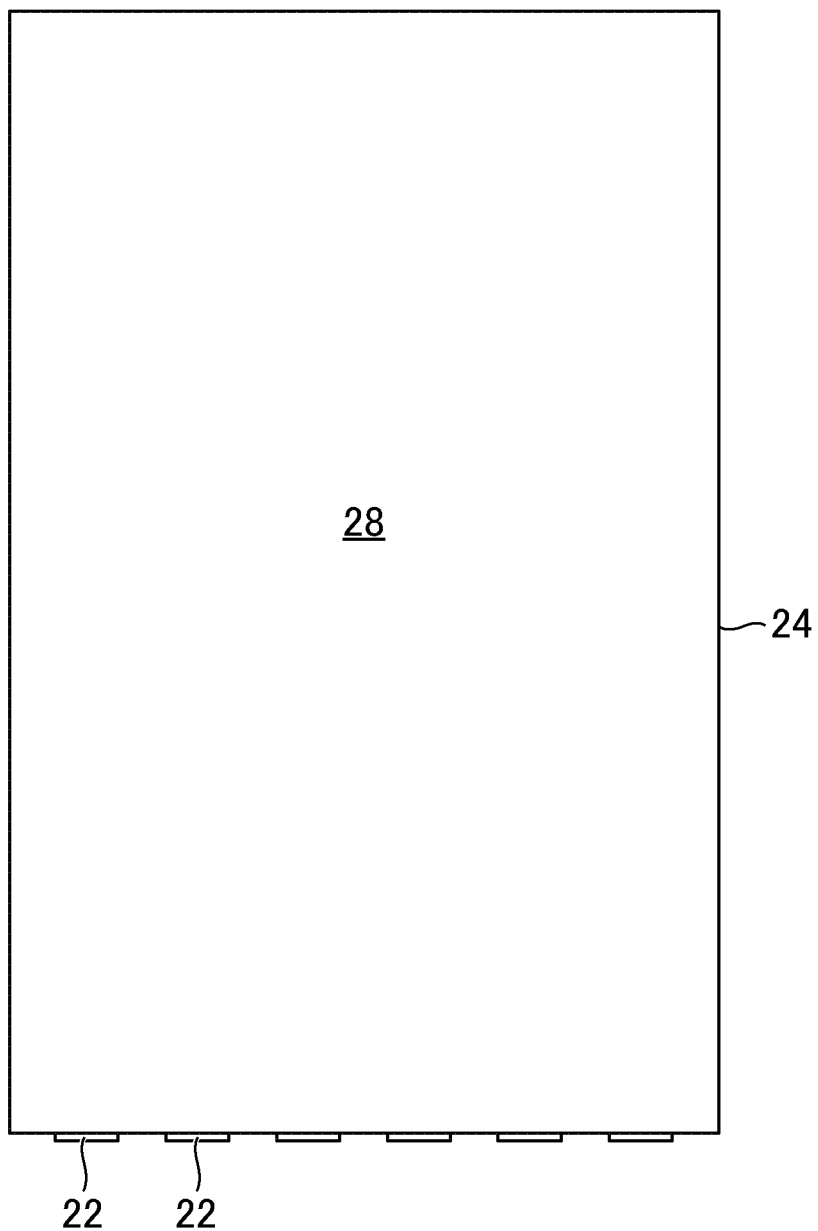
FIG. 2 is an overall plan view of a light guide plate and a light source.

FIG. 2 is an overall plan view of the light guide plate 24 and the light source 22. As illustrated in FIG. 2, the light source 22 is arranged so as to be opposed to the light guide plate 24.

Figure 3:
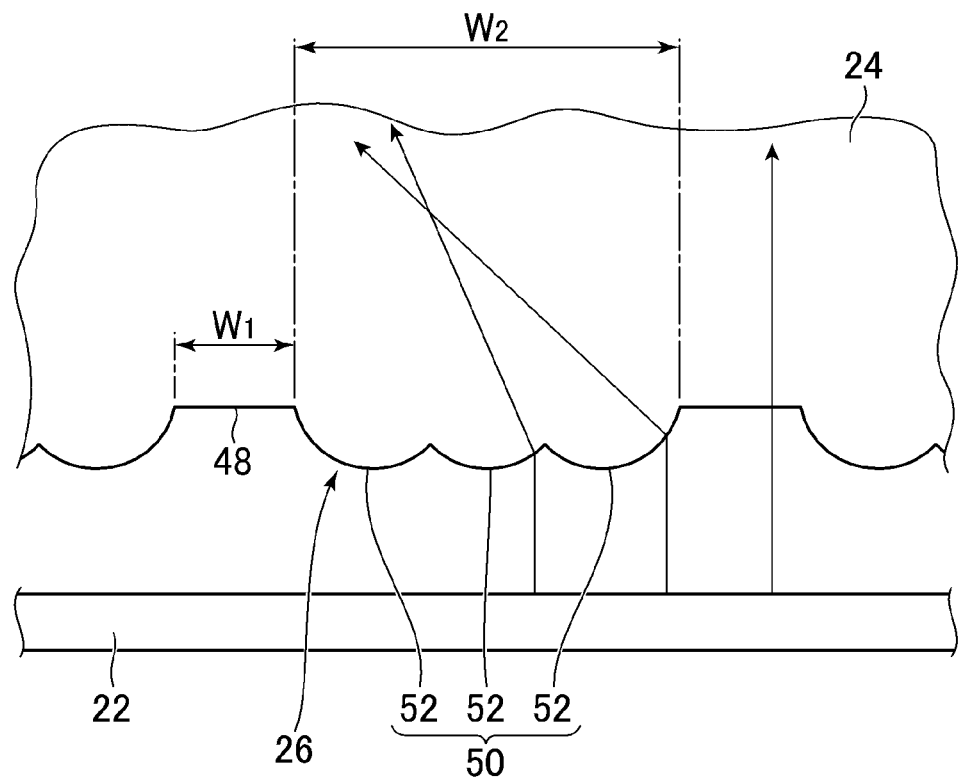
FIG. 3 is a partially enlarged plan view of the light guide plate and the light source.

FIG. 3 is a partially enlarged plan view of the light guide plate 24 and the light source 22. As illustrated in FIG. 3, the end surface 26 of the light guide plate 24, to which the light source 22 is opposed, includes a flat surface 48 and a protruding surface 50 protruding from the flat surface 48. Light traveling from the light source 22 in a direction perpendicular to the flat surface 48 travels straight at the flat surface 48. In contrast, at the protruding surface 50, the light enters the light guide plate 24 in an expanded manner due to refraction.

The protruding surface 50 has a shape in which a plurality of cylindrical surfaces 52 serving as a plurality of curved surfaces are integrated. A pair of cylindrical surfaces 52 positioned on both end portions of the protruding surface 50 in an arraying direction of the plurality of cylindrical surface 52 are each adjacent to the flat surface 48. A width $W_1$ of the flat surface 48 in the arraying direction of the plurality of cylindrical surfaces 52 is determined depending on the specification of the backlight unit to be designed. Adjacent cylindrical surfaces 52 are connected to each other at a position shifted in the protruding direction of the protruding surface 50 with respect to the flat surface 48.

Figure 4:
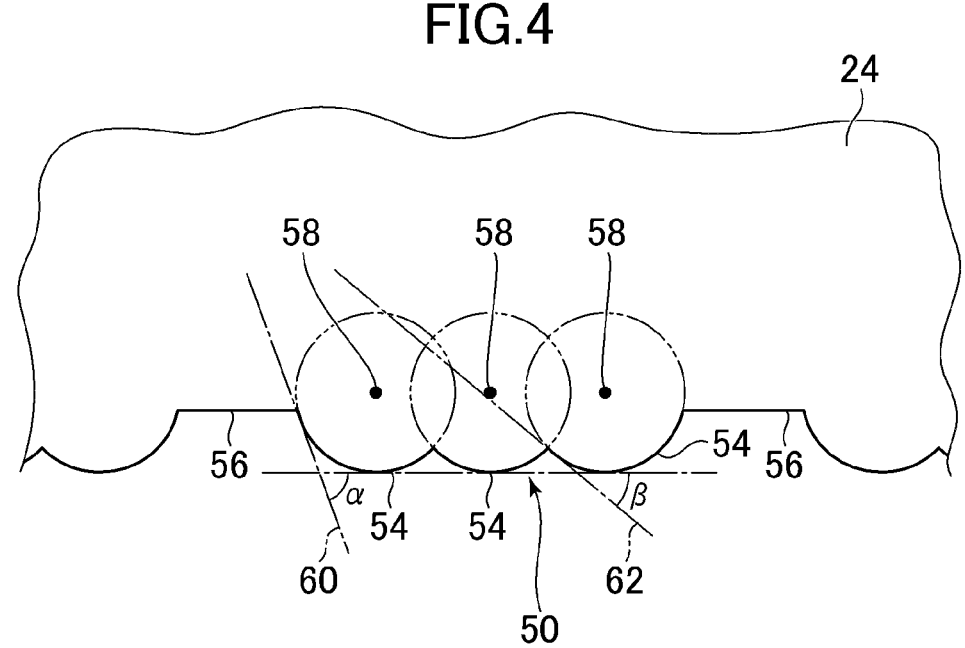
FIG. 4 is a view illustrating a shape of a protruding surface of the light guide plate.

FIG. 4 is a view illustrating a shape of the protruding surface 50 of the light guide plate 24. In a cross section taken along a plane parallel to the front surface 28 from which light exits, the plurality of cylindrical surfaces 52 represent a plurality of arcs 54, and the flat surface 48 represents a straight line 56. The respective plurality of arcs 54 (the plurality of cylindrical surfaces 52) are formed about a plurality of central axes 58 orthogonal to the front surface 28 from which the light exits. The plurality of arcs 54 are designed so that radii thereof are equal to each other. Alternatively, the radii of the plurality of arcs 54 are each within ±15% of a reference value.

The central points (central axes 58) of the plurality of arcs 54 are arranged in a line parallel to the straight line 56 represented by the flat surface 48. One arc 54 positioned on each end in the arraying direction is connected to the straight line 56 represented by the flat surface 48. An angle α formed between a first tangent line 60, which is brought into contact with the one arc 54 at a connection point with respect to the straight line 56, and the straight line 56 (or a line parallel thereto) is 70° on a side of the one arc 54 with which the first tangent line 60 is brought into contact. An angle β formed between a second tangent line 62, which is brought into contact with one of the adjacent arcs 54 at a connection point between the adjacent arcs 54, and the straight line 56 (or a line parallel thereto) is 40° on a side of the arc 54 with which the second tangent line 62 is brought into contact.

According to this embodiment, as illustrated in FIG. 3, light which travels in the direction perpendicular to the flat surface 48 and enters the light guide plate 24 travels straight at the flat surface 48. Further, the light is refracted to a greater extent at a region of the cylindrical surface 52 adjacent to the flat surface 48, and is refracted to a lesser extent at an adjacent region adjacent to the cylindrical surface 52. With this, the balance of light distribution can be adjusted, and thus it is possible to reduce brightness unevenness of the backlight unit 20 and increase an area of a region which is usable as the planar light source 28.

EXAMPLES

Figure 5:
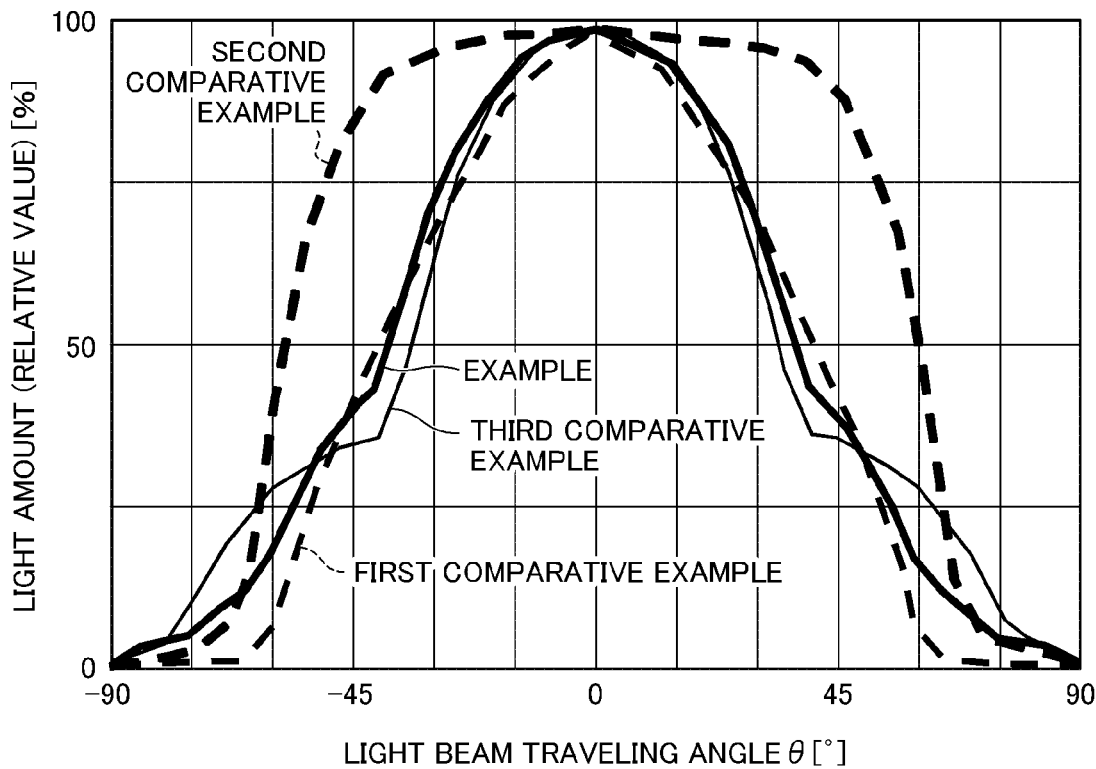
FIG. 5 is a graph showing light distribution characteristics of light guide plates according to an example and comparative examples of the present invention.
Figure 6:
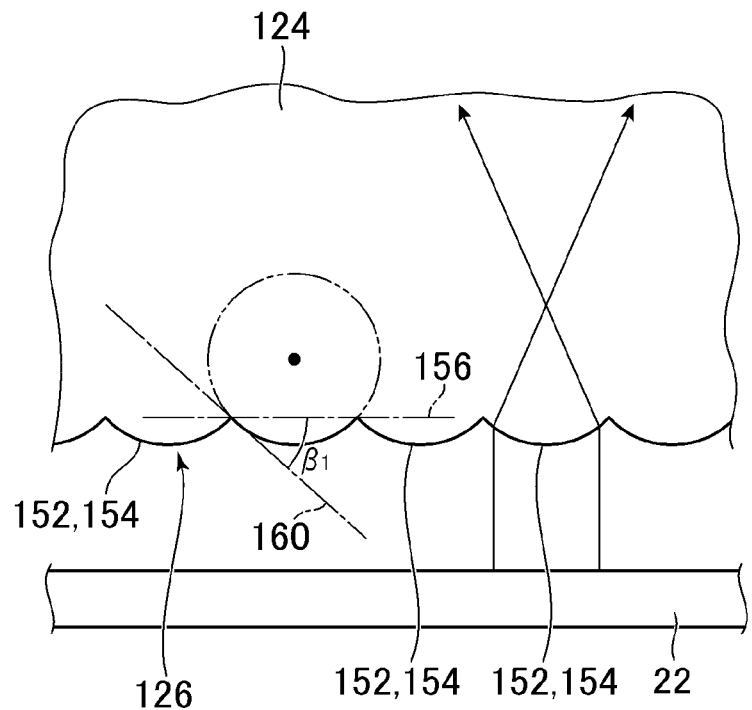
FIG. 6 is a view illustrating a shape of a light guide plate according to a first comparative example.
Figure 7:
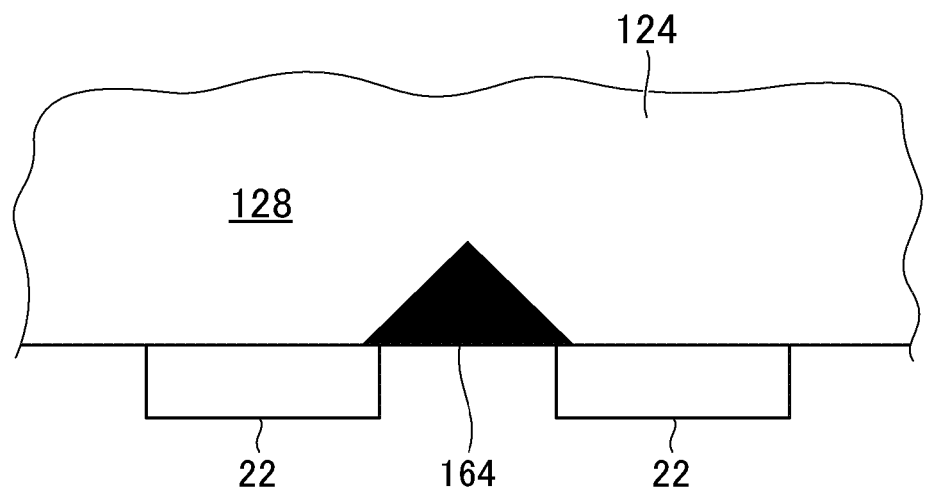
FIG. 7 is a view illustrating a dark portion of the light guide plate according to the first comparative example.

FIG. 5 is a graph showing light distribution characteristics of light guide plates according to an example and comparative examples of the present invention. FIG. 6 is a view illustrating a shape of a light guide plate according to a first comparative example. FIG. 7 is a view illustrating a dark portion of the light guide plate according to the first comparative example.

An end surface 126 of a light guide plate 124 into which light enters illustrated in FIG. 6 includes a plurality of cylindrical surfaces 152, and no flat surface is provided. The cylindrical surface 152 represents an arc 154, and connection points of respective adjacent arcs 154 are arranged along a straight line 156. An angle $\beta_1$ formed between a tangent line 160, which is brought into contact with one of adjacent arcs 154 at a connection point between the adjacent arcs 154, and the straight line 156 is 40° on a side of the one arc 154 with which the tangent line 160 is brought into contact. In this example, as shown in FIG. 5, light expansion is small. Therefore, as illustrated in FIG. 7, a dark portion 164 is formed at a front surface 128 of the light guide plate 124 from which the light exits.

Figure 8:
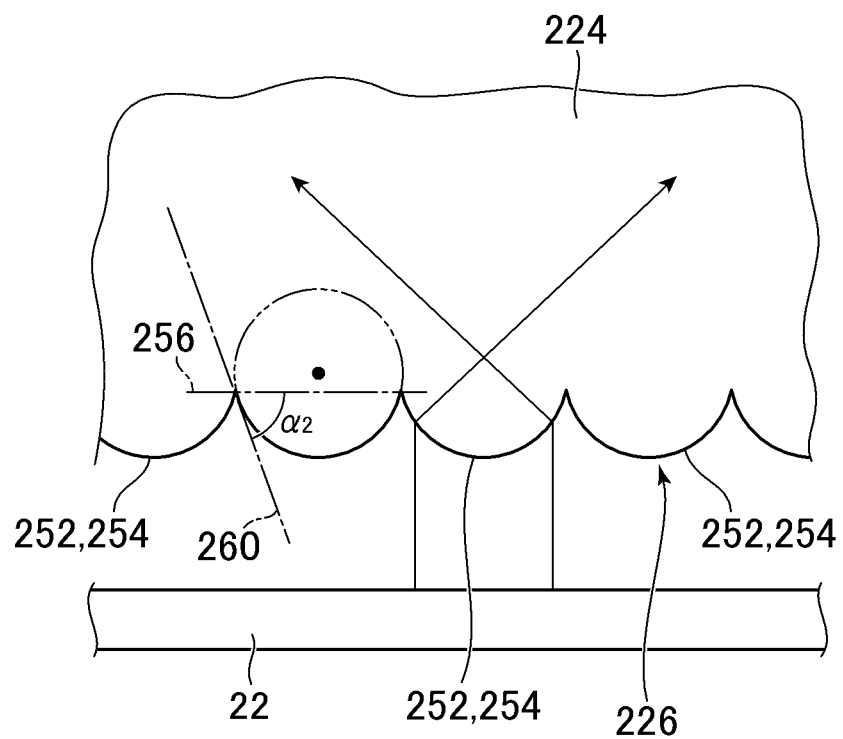
FIG. 8 is a view illustrating a shape of a light guide plate according to a second comparative example.
Figure 9:
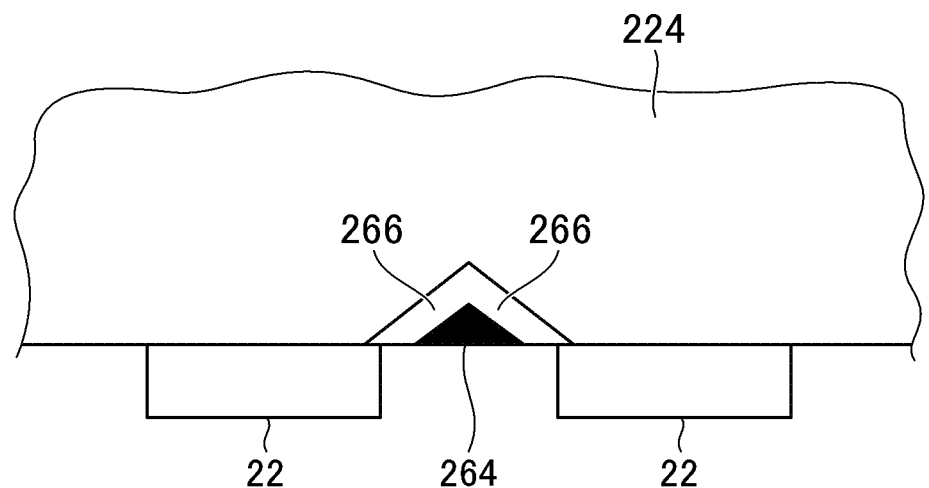
FIG. 9 is a view illustrating a dark portion and a bright portion of the light guide plate according to the second comparative example.

Next, FIG. 8 is a view illustrating a shape of a light guide plate according to a second comparative example. FIG. 9 is a view illustrating a dark portion and a bright portion of the light guide plate according to the second comparative example.

An end surface 226 of a light guide plate 224 into which light enters illustrated in FIG. 8 includes a plurality of cylindrical surfaces 252, and no flat surface is provided. The cylindrical surface 252 represents an arc 254, and connection points of respective adjacent arcs 254 are arranged along a straight line 256. An angle $\alpha_2$ formed between a tangent line 260, which is brought into contact with one of adjacent arcs 254 at a connection point between the adjacent arcs 254, and the straight line 256 is 70° on a side of the arc 254 with which the tangent line 260 is brought into contact. In this example, as shown in FIG. 5, light expansion is large. Therefore, as illustrated in FIG. 9, a dark portion 264 is small, but a bright portion 266 having a remarkable brightness is formed. It is presumed that the bright portion 266 is generated due to the large amount of light at an angle in the vicinity of 45°, which has good emission efficiency.

Figure 10:
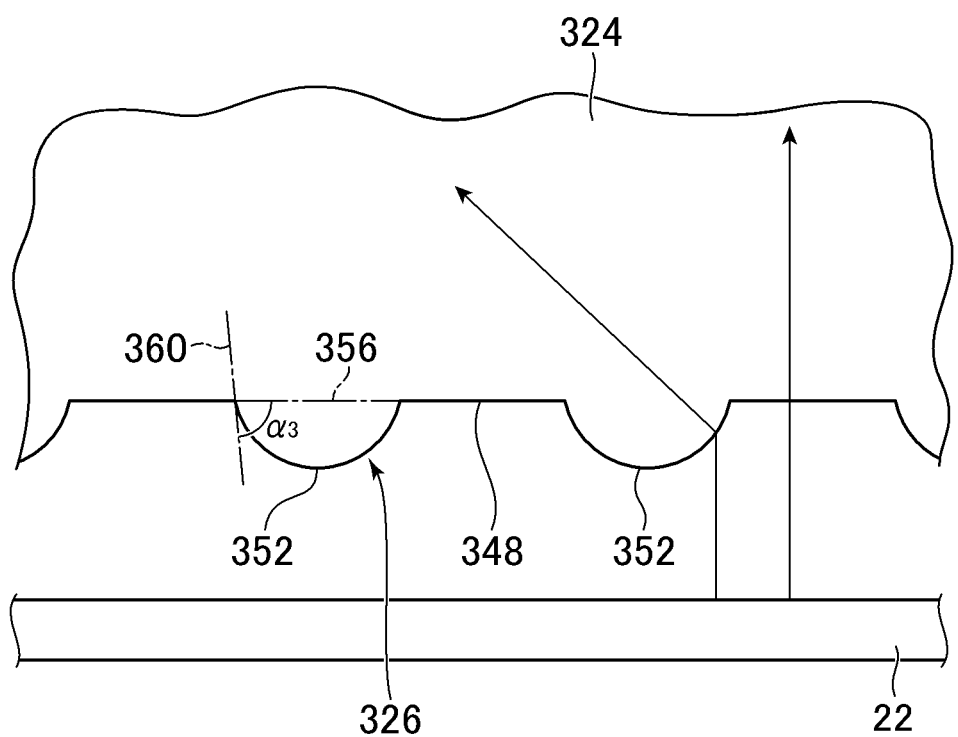
FIG. 10 is a view illustrating a shape of a light guide plate according to a third comparative example.
Figure 11:
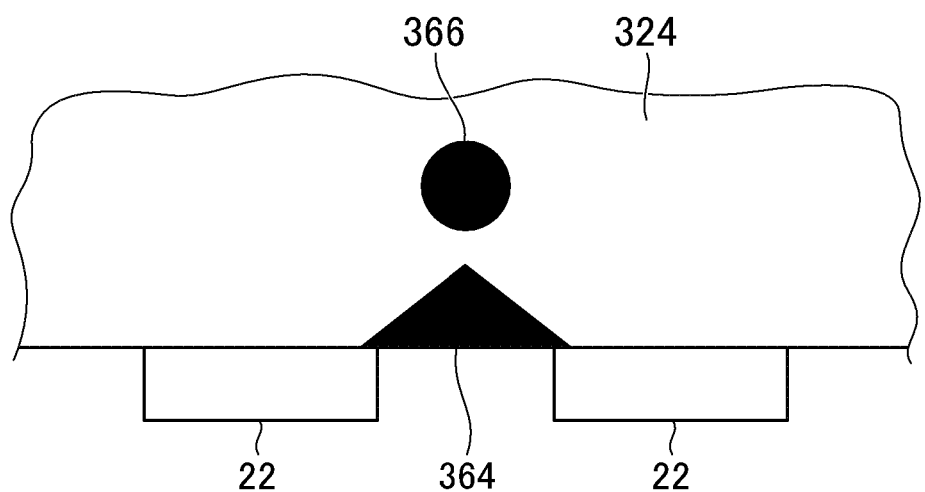
FIG. 11 is a view illustrating dark portions of the light guide plate according to the third comparative example.

Next, FIG. 10 is a view illustrating a shape of a light guide plate according to a third comparative example. FIG. 11 is a view illustrating dark portions of the light guide plate according to the third comparative example.

An end surface 326 of a light guide plate 324 into which light enters illustrated in FIG. 10 includes a plurality of cylindrical surfaces 352, and a flat surface 348 is provided between adjacent cylindrical surfaces 352. The shape of the cylindrical surface 352 is the same as that illustrated in FIG. 8, and an angle $\alpha_3$ between a tangent line 360 and a straight line 356 is 70°. In this example, as shown in FIG. 5, the amount of light in the vicinity of 40° to 45° drastically reduces. Therefore, as illustrated in FIG. 11, the bright portion 266 of the second comparative example is eliminated, but in addition to a dark portion 364 that is similar to that of the second comparative example, a dark portion 366 is further formed.

As shown in FIG. 5, in the example of the present invention, light expansion is larger than the case of the first comparative example. Further, as is apparent from the comparison with respect to the second comparative example, the light amount in the vicinity of 45° is not too large, and as compared to the third comparative example, there is no angle at which the light amount drastically reduces. Therefore, the dark portion becomes small, and no excessively bright part is formed.

Figure 12:
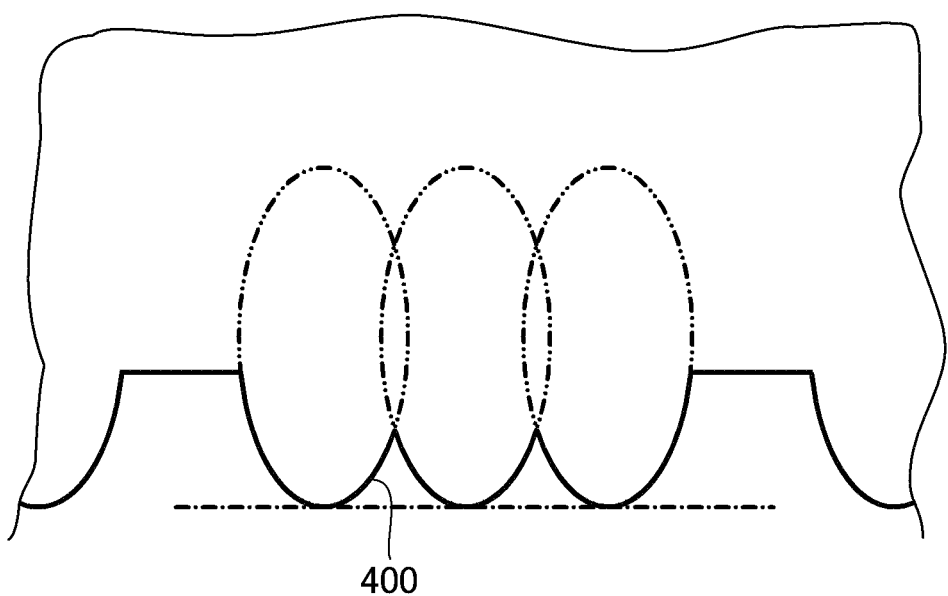
FIG. 12 is a view illustrating an elliptic cylindrical surface protruding with respect to a flat surface of another example of the present invention.
Figure 13:
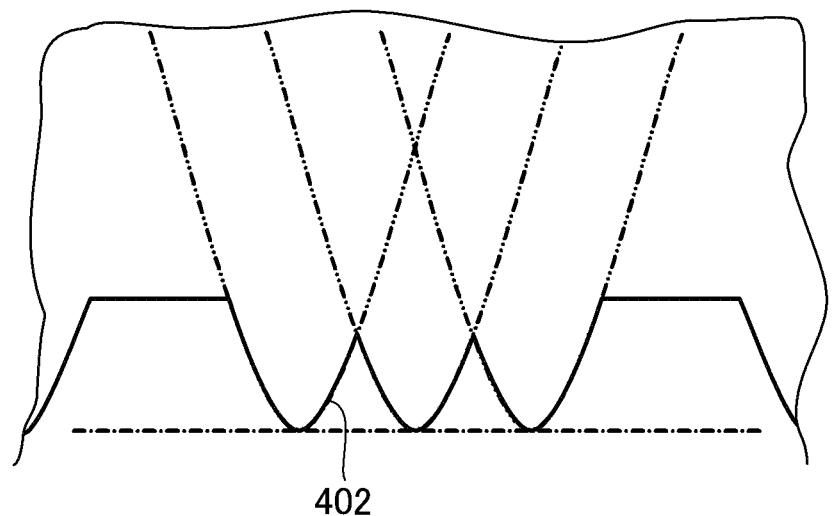
FIG. 13 is a view illustrating a quadratic curve surface protruding with respect to a flat surface of still another example of the present invention.
Figure 14:
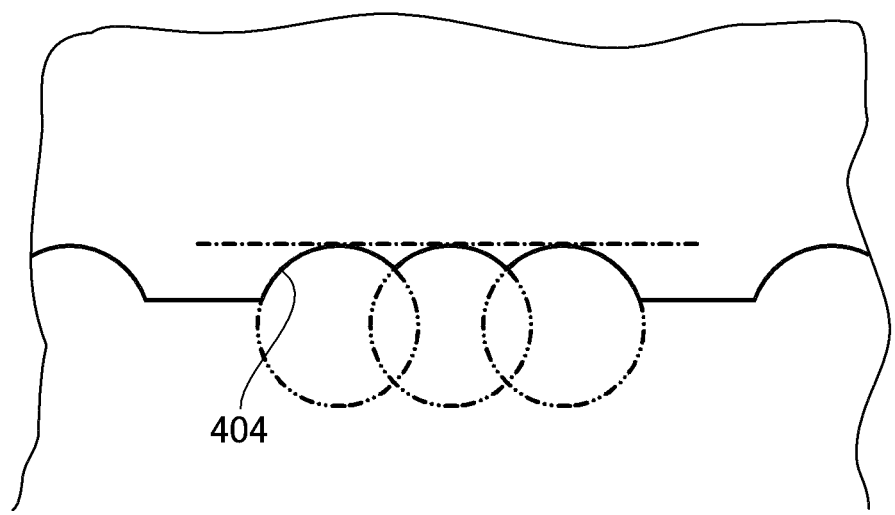
FIG. 14 is a view illustrating a cylindrical surface recessed with respect to a flat surface of further another example of the present invention.
Figure 15:
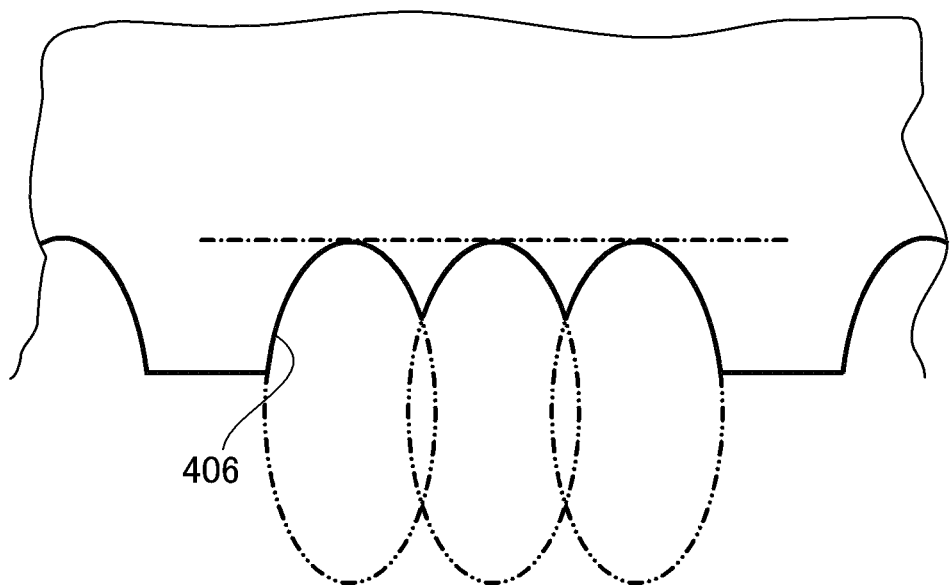
FIG. 15 is a view illustrating an elliptic cylindrical surface recessed with respect to a flat surface of further another example of the present invention.
Figure 16:
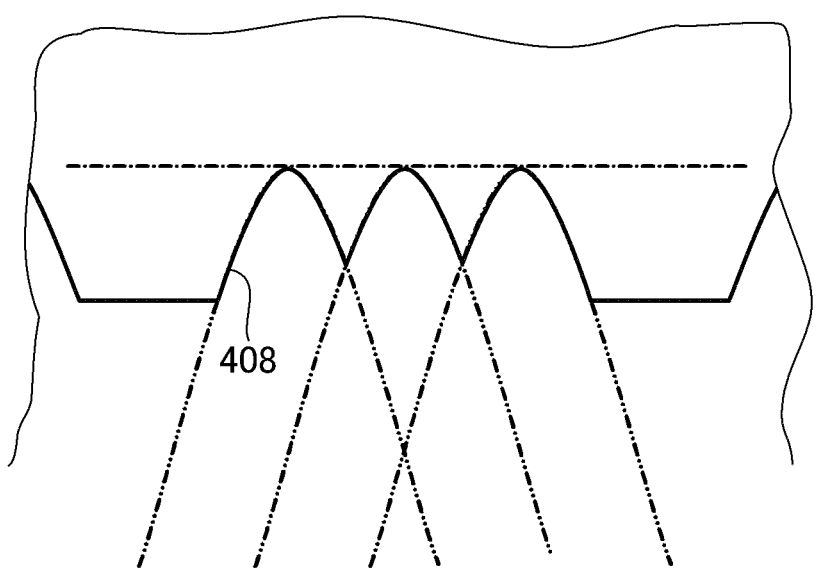
FIG. 16 is a view illustrating a quadratic curve surface recessed with respect to a flat surface of further another example of the present invention.

The present invention is not limited to the above-mentioned embodiment, and various modifications may be made thereto. The structure described in the embodiment may be replaced by substantially the same structure, a structure providing the same action and effect, or a structure capable of achieving the same object. For example, as illustrated in FIGS. 12 and 13, the cylindrical surface may be replaced by an elliptic cylindrical surface 400, or a quadratic curve surface 402. Even in this case, the effects of the present invention can be obtained. Alternatively, as illustrated in FIGS. 14, 15, and 16, the protruding surface including the cylindrical surfaces, the elliptic cylindrical surfaces, or the quadratic curve surfaces, which protrudes with respect to the flat surface, may be replaced by a recessed surface including cylindrical surfaces 404, elliptic cylindrical surfaces 406, or quadratic curve surfaces 408, which is recessed with respect to the flat surface. Even in this case, the effects of the present invention can be obtained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
   a display panel; and
   a backlight unit to be used as a planar light source for the display panel,
   wherein the backlight unit comprises:
      a light source having an emission region narrower than an emission region of the planar light source; and
      a light guide plate having an end surface into which light from the light source enters, and a front surface from which the light exits,
   wherein the end surface of the light guide plate comprises:
      a flat surface; and
      one of a protruding surface which protrudes with respect to the flat surface and a recessed surface which is recessed with respect to the flat surface,
   wherein light traveling from the light source in a direction perpendicular to the flat surface enters the light guide plate in an expanded manner due to refraction at the one of the protruding surface and the recessed surface,
   wherein the one of the protruding surface and the recessed surface has a shape in which a plurality of curved surfaces are integrated, the respective plurality of curved surfaces being formed about a plurality of central axes which are orthogonal to the front surface from which the light exits,
   wherein a pair of curved surfaces of the plurality of curved surfaces, which are positioned at both end portions of the one of the protruding surface and the recessed surface in an arraying direction of the plurality of curved surfaces, is each adjacent to the flat surface, wherein adjacent curved surfaces of the plurality of curved surfaces are connected to each other at a connection end point between the adjacent curved surfaces which is at a position shifted in one of a protruding direction and a recessed direction of the one of the protruding surface and the recessed surface with respect to the flat surface, and wherein, in a cross section taken along a plane parallel to the front surface from which the light exits, the plurality of curved surfaces represent a plurality of contiguous arcs, and the flat surface represents a straight line.

2. The display device according to claim 1, wherein the plurality of arcs are designed so as to each have a mutually similar shape.

3. The display device according to claim 1, wherein the plurality of arcs each have a similarity ratio that is within ±15% of a reference value.

4. The display device according to claim 1, wherein the plurality of arcs have one of most protruding points and most recessed points, respectively, which are arranged in a line parallel to the straight line represented by the flat surface.

5. The display device according to claim 1, wherein one of the plurality of arcs, which is positioned at each end in the arraying direction, is connected to the straight line represented by the flat surface, wherein the straight line and a first tangent line, which is brought into contact with the one of the plurality of arcs at a connection point with respect to the straight line, form an angle of 70° on a side of the one of the plurality of arcs with which the first tangent line is brought into contact, and wherein the straight line and a second tangent line, which is brought into contact with one of adjacent arcs of the plurality of arcs at the connection end point between the adjacent arcs, form an angle of 40° on a side of the one of the adjacent arcs with which the second tangent line is brought into contact.

6. The display device according to claim 1, wherein the one of the protruding surface, which protrudes with respect to the flat surface, and the recessed surface, which is recessed with respect to the flat surface, comprises one of a cylindrical surface, an elliptic cylindrical surface, and a quadratic curve surface.

7. The display device according to claim 1, wherein a straight line extending through the connection end points of the adjacent curved surfaces of the plurality of curved surfaces extends in parallel to the straight line of the flat surface at a position spaced from the straight line of the flat surface.

* * * * *